Figure 1:
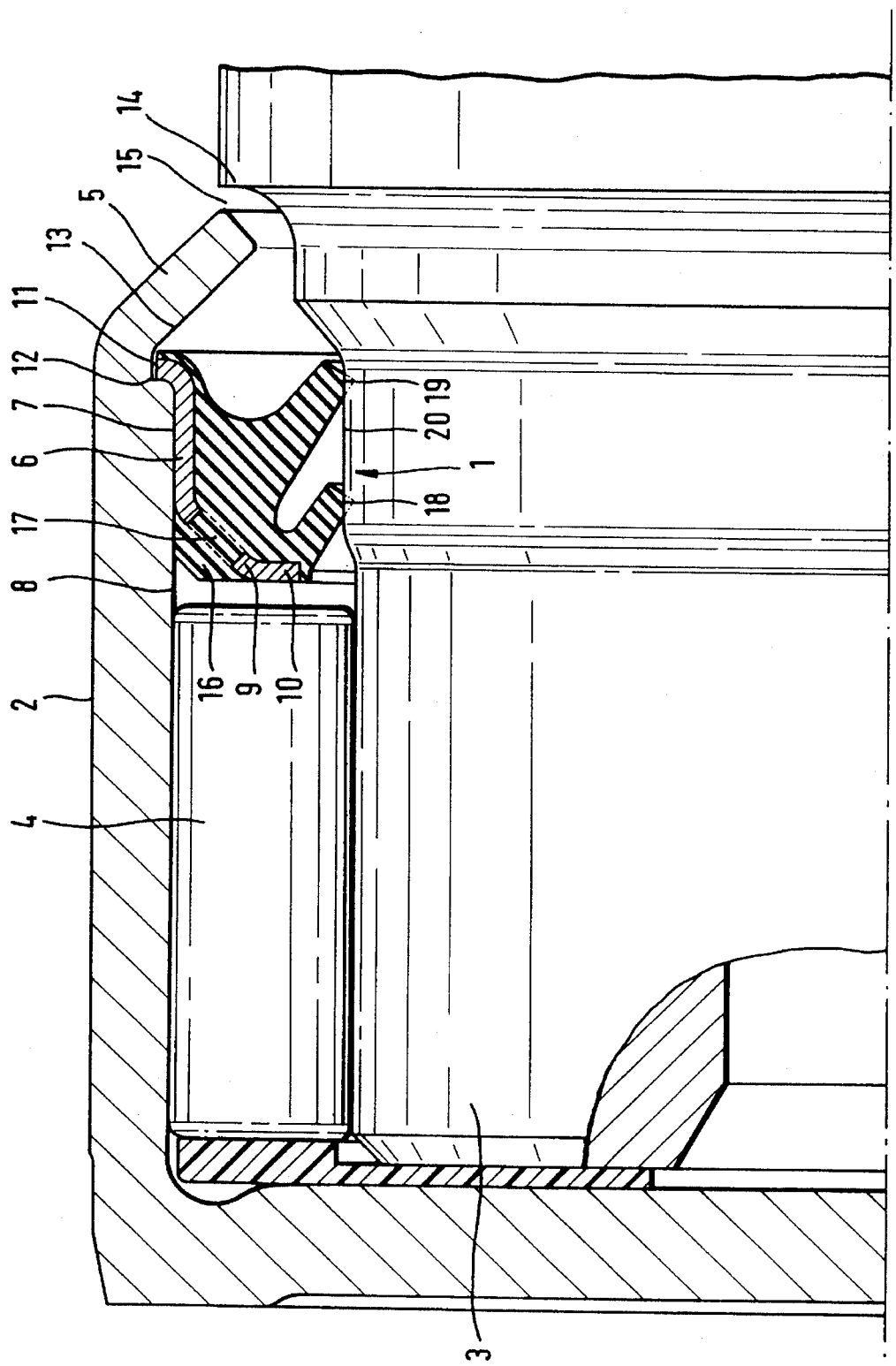

United States Patent [19]
Rieder

[11] Patent Number: 5,597,356
[45] Date of Patent: Jan. 28, 1997

[54] SEALING ARRANGEMENT FOR A CARDAN SPIDER BUSH

[75] Inventor: Guido Rieder, Wilhelmsdorf, Germany

[73] Assignee: INA Walzlager Schaeffler KG, Germany

[21] Appl. No.: 645,128

[22] Filed: May 13, 1996

Related U.S. Application Data

[63] Continuation of Ser. No. 407,417, Mar. 17, 1995, abandoned.

[30] Foreign Application Priority Data

Apr. 8, 1994 [DE] Germany ............... 44 12 132.6

[51] Int. Cl.⁶ .................. F16C 33/78; F16J 15/32
[52] U.S. Cl. .................. 464/131; 277/152; 277/183; 384/484; 384/486
[58] Field of Search .................. 277/47, 48, 49, 277/152, 183; 464/128, 131; 384/138, 147, 484, 486, 488, 904, 905.1

[56] References Cited

U.S. PATENT DOCUMENTS

| | | | |
|---|---|---|---|
| 2,873,153 | 2/1959 | Haynie | 384/484 |
| 3,306,683 | 2/1967 | Duering | 277/183 |
| 3,423,140 | 1/1969 | Cowles | 277/183 |
| 4,645,474 | 2/1987 | Olschewski et al. | 464/131 |
| 4,756,382 | 3/1988 | Scharting et al. | 464/131 |
| 4,810,233 | 3/1989 | Crane, Jr. et al. | 384/484 |
| 4,834,691 | 5/1989 | Schultze et al. | 464/131 |
| 4,943,262 | 7/1990 | Schultze | 464/131 |
| 4,949,981 | 8/1990 | Nagashima | 384/484 |
| 4,968,044 | 11/1990 | Petrak | 277/152 |
| 5,026,324 | 6/1991 | Schurger et al. | 277/152 |

FOREIGN PATENT DOCUMENTS

| | | | |
|---|---|---|---|
| 2668218 | 4/1992 | France | 384/486 |
| 3118430 | 11/1982 | Germany | 464/131 |
| 968837 | 9/1964 | United Kingdom | 464/131 |

*Primary Examiner*—Scott Cummings
*Attorney, Agent, or Firm*—Bierman and Muserlian

[57] ABSTRACT

A sealing arrangement for a bearing bush of a cardan spider of a universal joint of a propeller shaft, in which a bearing journal is mounted on a rolling bearing, said sealing arrangement comprising an armored seal inserted into the bearing bush at a free end thereof and having at least one sealing lip which bears against a surface of the bearing journal under pre-tension, characterized in that the sealing arrangement comprises a seal (1,21) whose armoring (6) assures an axial positional fixing of the seal (1,21) by a positive engagement with an inner surface (8) of the bearing bush (2).

4 Claims, 3 Drawing Sheets

SEALING ARRANGEMENT FOR A CARDAN SPIDER BUSH

PRIOR APPLICATION

This application is a Continuation of U.S. Patent Application Ser. No. 407,417, filed Mar. 17, 1995, now abandoned.

STATE OF THE ART

Bearing bushes of this type are used in universal joints of propeller shafts in different technical fields such as vehicles, agricultural machines and construction and earth-moving equipment. Such propeller shafts permit an angular torque transmission. However, the universal joints are exposed to outside influences such as, for instance, humidity, dust and dirt. Inadequately sealing bearing bushes lead to a failure of the bearing journal mounting which causes a standstill of the vehicle or machine.

A seal of the above type is known from DE-A 31 18 430 which seal for a bearing bush comprises an armoring which bears partially against an inner surface of a bearing bush, while a further portion of the armoring extends into or is surrounded by the sealing body of the seal. Thin-walled elastic sealing lips starting from the sealing body of this seal bear against the surface of the bearing journal. A further seal or a separate retaining ring is associated to this seal to form a further sealing gap which serves to improve sealing or to axially secure the seal. This known seal involves complicated mounting and comprises numerous components so that it is cost-intensive.

OBJECTS OF THE INVENTION

It is an object of the invention to provide a seal which, without additional components, assures an effective axial securing or positional fixing of the seal and a high quality of sealing while being cost-effective in manufacturing and simple to mount.

This and other objects and advantages of the invention will become obvious from the following detailed description.

THE INVENTION

The seating arrangement of the invention for a bearing bush of a cardan spider of a universal joint of a propeller shaft, in which a bearing journal is mounted on a rolling bearing, said sealing arrangement comprising an armored seal inserted into the bearing bush at a free end thereof and having at least one sealing lip which bears against a surface of the bearing journal under pretension, is characterized in that the sealing arrangement comprises a seal (1,21) whose armoring (6) assures an axial positional fixing of the seal (1,21) by a positive engagement with an inner surface (8) of the bearing bush (2).

In another embodiment of the invention, the sealing arrangement for a bearing bush of a cardan spider of a universal joint of a propeller shaft, in which a bearing journal is mounted on a rolling bearing, said sealing arrangement comprising an armored seal inserted into the bearing bush at a free end thereof and having at least one sealing lip which bears against a surface of the bearing journal under pre-tension, is characterized in that, to form an axial stop, the seal (41) comprises an armoring (46) which bears against an end face or shoulder (52) of the bearing bush (2) while extending to a shoulder (54) of the bearing journal (3).

The independent embodiments of the invention provide a multistep seal for sealing bearing bushes and a positional fixing or axial securing of the seal in the two embodiments is assured by different configurations of the armoring. In the first embodiment, the seal is positionally fixed by the armoring on the inner surface of the bearing bush whereas in the second embodiment, there is provided a stop on the end face of the bearing bush and on a shoulder of the bearing journal for axial securing of the seal by the armoring. A common advantageous feature of both embodiments is that the armoring is made by chipless shaping which offers an economical advantage and is thus suitable for large-series manufacturing. In contrast to known seals, the seals of the invention simplify mounting and reduce the number of individual components required and thus also, advantageously, the costs of sealing a bearing bush without detracting from the quality of sealing.

The positional fixing of the seal exclusively in the bearing bush in the first embodiment of the invention offers an additional advantage with respect to the required design space because the seal does not protrude beyond the outer contour of the bearing bush.

In a further development of this embodiment, the inner surface of the pot-shaped bearing bush comprises in the direction of the open end thereof, a radial, circumferential recess which extends axially up to the seal and comprises a shoulder at an inner end. This shoulder forms a contact surface for a radially outwards oriented right-angled fold of the armoring. A defined positioning of the seal can be assured by the cooperation of the fold with the shoulder. An effective axial securing of the seal is advantageously obtained by a radially inwards oriented crimping of the thin-walled end region of the bearing bush wall.

The end region of the bearing bush wall inclined radially towards the bearing journal is dimensioned and configured to form a sealing gap with a shoulder formed on the bearing journal. Advantageously, this configuration of the bearing bush wall results in an effective pre-sealing and protection of the seal arranged within the bearing bush.

In a further advantageous development of the invention, the end region of the bearing bush wall comprising a recess is relatively short and crimped radially inwards already before the installation of the seal. This results in the possibility of finish-working and hardening the bearing bush wall before the mounting of all associated components. The radial fold of the armoring for effecting axial securing is matched with the crimped bearing bush wall so that, under limited deformation, it can lock-in during assembly behind the crimped portion of the bearing bush wall.

In a development of the second embodiment of the invention, the armoring for effecting axial securing has the following configuration. The armoring comprises a large-surface fold which bears against an end face of the bearing bush wall, and an arc-shaped portion of the armoring starting from the fold extends up to the shoulder of the bearing journal. The armoring thus assures a desired additional positional fixing of the seal in both possible axial directions. Besides this, the arc-shaped portion between the fold and the shoulder of the bearing journal effectively protects the seal and assumes the function of a pre-seal.

The armoring, i.e. its arc-shaped portion, forms a sealing gap with the shoulder of the bearing journal, and a defined dimensioning of the gap can improve the sealing quality of the entire sealing arrangement. It is advantageous to make openings in the armoring through which the material of the sealing body can penetrate during the injection molding (manufacturing) process of the seal to improve bonding between these two parts.

REFERRING NOW TO THE DRAWINGS

Figure 2:
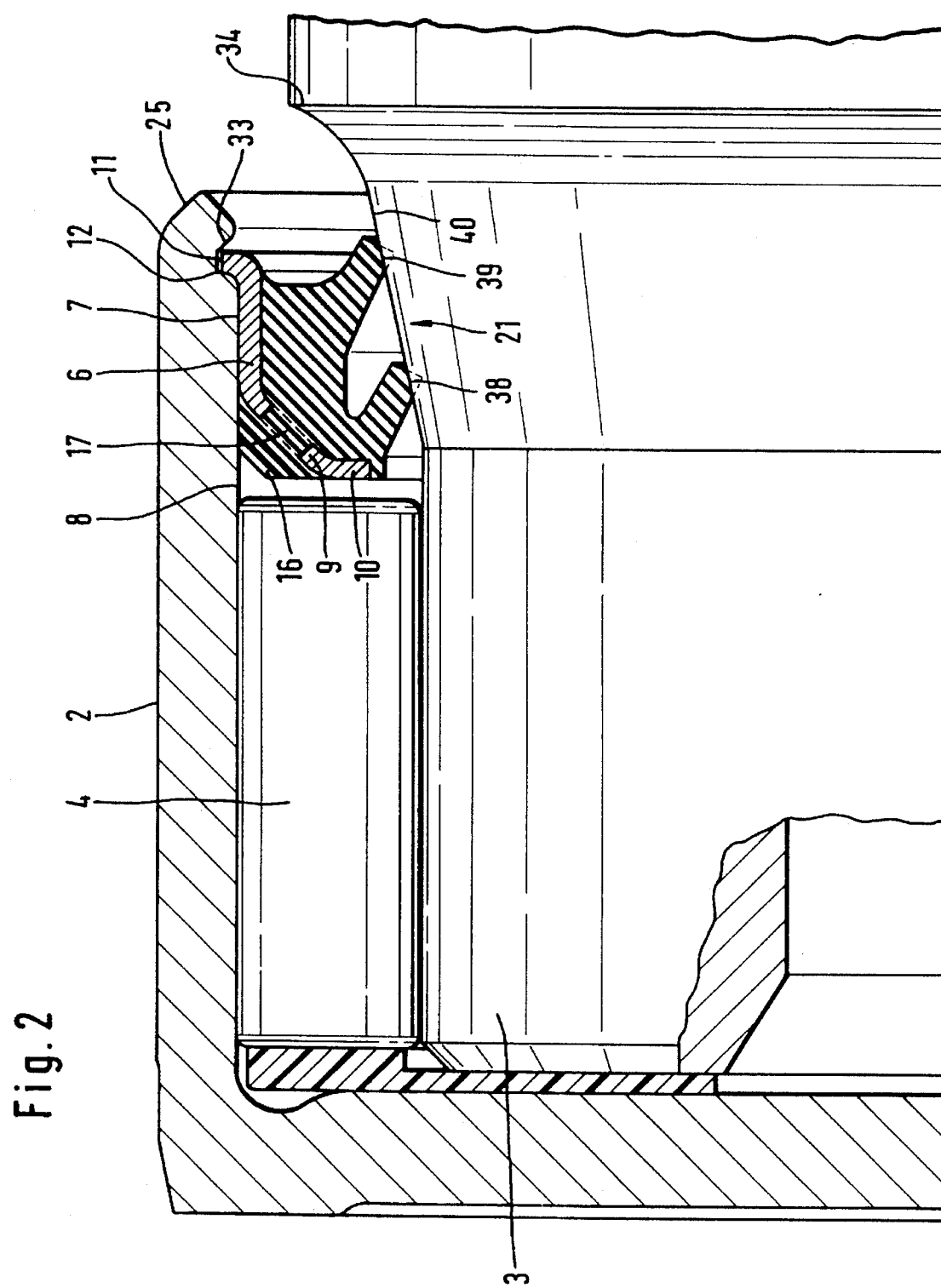
Figure 3:
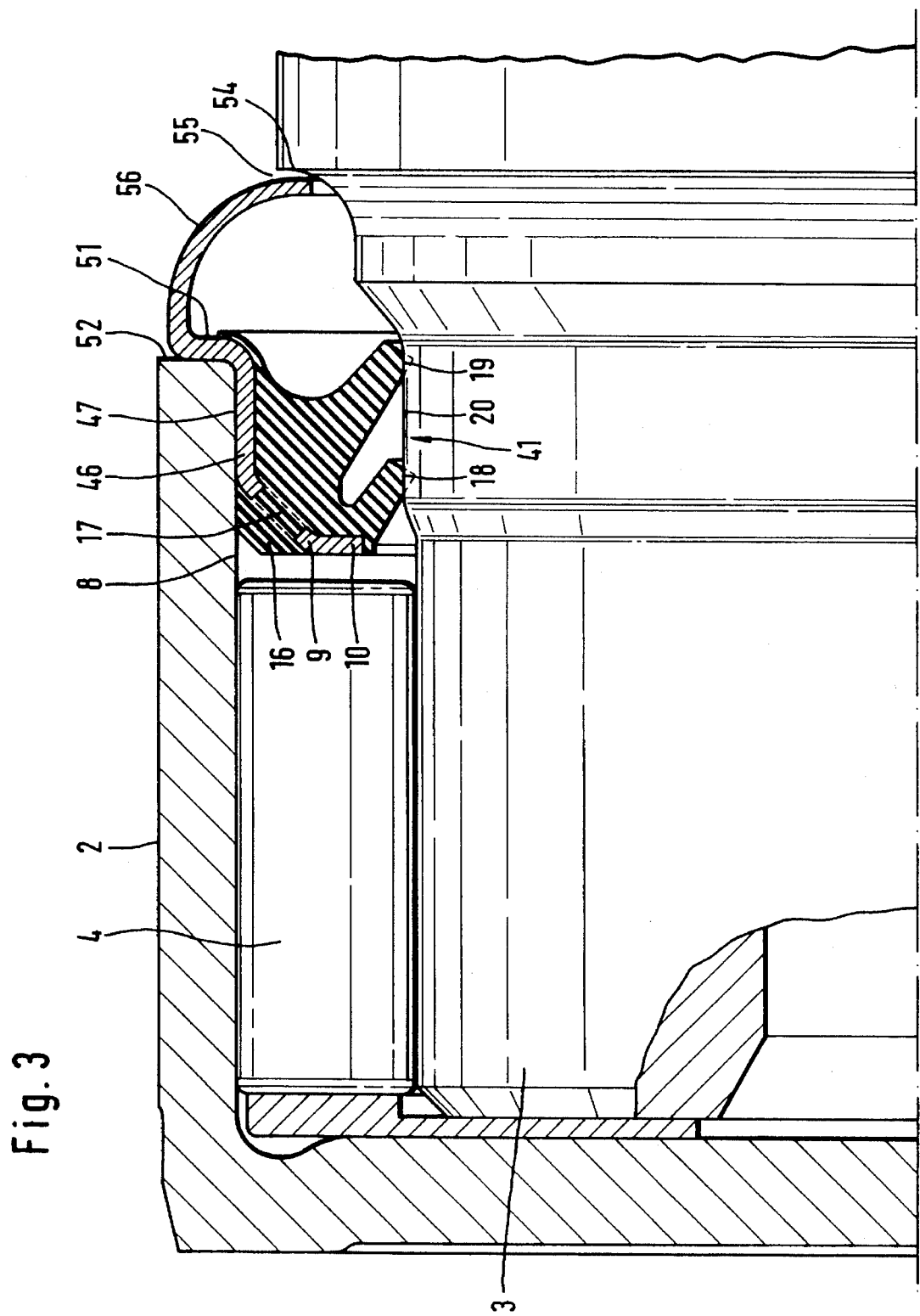

FIG. 1 is a partial longitudinal cross-section of a sealing arrangement of the invention inserted into a bearing bush, FIG. 2 is a partial longitudinal cross-section of the sealing arrangement of FIG. 1 but with a modified end-sealing of the bearing bush wall, and FIG. 3 is a partial longitudinal cross-section of a second embodiment of the sealing arrangement of the invention wherein the armoring is supported on the bearing bush and the bearing journal to effect axial securing of the seal.

The structure of the sealing arrangement of the invention for a cardan spider bush will first be explained with reference to FIG. 1. The sealing arrangement shown in its installed position comprises a seal (1) which is inserted into a bearing bush (2) at a free end thereof, which bearing bush (2) is pot-shaped and surrounds a bearing journal (3) mounted therein on a rolling bearing having needle-shaped rolling elements (4). The seal (1) which fills a circular ring-shaped space between the bearing journal (3) and the bearing bush (2) extends axially between the rolling elements (4) and an end portion (5) of the bearing bush (2). The seal (1) comprises an armoring (6) having a cylindrical portion (7) which bears directly against an inner surface (8) of the bearing bush (2), An inclined connecting region (9) of the armoring (6) connects the cylindrical portion (7) to a radial portion (10) oriented towards the rolling elements (4). At an end opposite the radial portion (10), the armoring (6) comprises a radially outwards oriented right-angled fold (11) which bears against a shoulder (12) of the bearing bush wall. This shoulder (12) forms the end of a stepped recess made on the inner surface (8) of the bearing bush (2) at its free end. As shown in FIG. 1, to effect a positional fixing of the seal (1), the end portion (5) is crimped radially inwards after installation of the seal (1) so that a sealing gap (15) is formed between a shoulder (14) of the bearing journal (3) and the end portion (5).

The sealing ring (1) comprises a sealing body (16) whose elastic material, particularly made of an elastomer, partially surrounds the armoring (6) and fills openings (17) spaced regularly over the circumference in the connecting region (9) of the armoring (6). The sealing body (16) comprises two sealing lips (18,19) which are equally inclined towards the shoulder (14) and bear under pre-tension against a cylindrical surface (20) of the bearing journal (3).

In the examples of the embodiment shown in FIGS. 2 and 3, the same reference numbers have been used as in the first embodiment (FIG. 1) for like parts so as to avoid repetition, reference can thus be made to the description of the first embodiment.

FIG. 2 shows the sealing ring (21) which, similar to the sealing ring (1) of FIG. 1, to effect axial securing, comprises a fold (11) bearing against the shoulder (12) of the bearing bush (2). In contrast to FIG. 1, there is provided a shortened end portion (25) and a recess (33) adapted thereto. Due to this configuration, no post-working of the bearing bush (2) is required after installation of the seal (21), i.e. the end portion does not need to be crimped. On the other hand, the bearing bush can also be hardened before assembly, if necessary. A further difference relates to the surface (40) of the bearing journal (3) which widens conically towards the shoulder (34) to reduce the distance between the end portion (25) and the bearing journal (3). The sealing lips (38 and 39) are adapted in shape to the contour of the surface (40).

The embodiment represented in FIG. 3 shows the seal (41) comprising armoring (46) whose cylindrical portion (47) bears against the inner surface (8) of the bearing bush (2). A large-surfaced fold (51) of the armoring bears against the end face of the bearing bush (2) which forms a shoulder (52) for the armoring (46). Starting from this shoulder (52), the armoring (46) forms an arc-shaped portion (56) which extends towards the bearing journal (3) and ends with its free end, situated in front of the shoulder (54) of the bearing journal (3) to form a sealing gap (55). Axial securing of the seal is thus effected in one direction by the fold (51) bearing against the shoulder (52) and in the opposite direction, by the arc-shaped portion (56) extending up to the shoulder (54).

Various modifications of the sealing arrangement of the invention may be made without departing from the spirit or scope thereof and it is to be understood that the invention is intended to be limited only as defined in the appended claims.

What is claimed is:

1. A sealing arrangement for a needle roller bearing having rolling elements (4), and which rotatably receives a bearing journal (3) therein, said sealing arrangement comprising an armored seal (1,21) which is arranged on an open end of a bearing bush (2) and is guided on an inner surface (8) of the bearing bush (2) while being fixed in position by a radially inwards crimped end portion (5) of a wall of the bearing bush (2), said armored seal (1, 21) comprising at least one sealing lip (18, 19; 38, 39) which bears sealingly against the bearing journal (3), characterized in that the seal (1, 21) is completely surrounded radially by the wall of the bearing bush (2), and a free end of the end portion (5) forms an open sealing gap (15) with a shoulder (14) of the bearing journal (3).

2. A sealing arrangement for a needle bearing having rolling elements (4), and which rotatably receives a bearing journal (3) therein, said sealing arrangement comprising an armored seal (41) which is arranged on an open end of a bearing bush (2) while comprising at least one sealing lip (18, 19) which bears sealingly against the bearing journal (3), characterized in that the seal (41) comprises an armoring (46) having a cylindrical portion (47) merging into a radially outward oriented fold (51) which continues into an arc-shaped portion (56), the armoring (46) is supported on an inner surface (8) of the bearing bush (2) by the cylindrical portion (47) and on an end face of the bearing bush (2) by the fold (51), while an end region of the arc-shaped portion (56) forms a sealing gap (55) with a shoulder (54) of the bearing journal (3).

3. The sealing arrangement of claim 1 wherein the seal (1, 21) comprises two axially spaced sealing lips (18, 19; 38, 39) which are equally inclined towards a shoulder (14, 34) of the bearing journal (3).

4. The sealing arrangement of claim 2 wherein the seal (41) comprises two axially spaced sealing lips (18, 19) which are equally inclined towards a shoulder (54) of the bearing journal (3).

* * * * *